Dec. 18, 1956 M. W. BULLOCK 2,774,808

ELECTRICAL EQUIPMENT CABINETS

Filed April 9, 1952 3 Sheets-Sheet 1

INVENTOR.
Mark W. Bullock
BY
Moses, Nolte, Crews & Berry
ATTORNEYS

INVENTOR.
Mark W. Bullock
BY
Moses, Nolte, Crews & Berry
ATTORNEYS

INVENTOR.
Mark W. Bullock
BY
Moses, Nolte, Crews & Berry
ATTORNEYS

United States Patent Office 2,774,808
Patented Dec. 18, 1956

2,774,808

ELECTRICAL EQUIPMENT CABINETS

Mark W. Bullock, Dallas, Tex., assignor to Continental Electronics Manufacturing Company, Dallas, Tex., a corporation of Texas Application April 9, 1952, Serial No. 281,444

1 Claim. (Cl. 174—16)

The present invention relates to equipment cabinets, and more particularly to cabinets suitable for the enclosure of electrical devices or other apparatus by which heat is generated in the normal course of operation of such apparatus.

The present common practice in the construction of equipment cabinets for the housing of electronic apparatus used for radio transmitters, television transmitters, power supplies, antenna phasing equipment and the like, is to provide a rigid metal framework to which a sheet metal "skin" is subsequently attached. The cabinet of the present invention avoids the necessity for providing such a separate framework with its numerous structural component parts.

Among the objects of the present invention is the provision of a cabinet of sheet metal construction in which the metal sheets are formed to impart to the cabinet a sufficient degree of rigidity, so that no supporting framework is required.

Another object of the invention is the provision of a cabinet of this character which is entirely made up of formed sheet metal, including sides, doors, base plates, panels, and styling strips, thereby effecting substantial savings in manufacturing time and cost.

Still another object of the invention is the provision of a cabinet in which the heat dissipating apparatus installed therein may be vertically arranged upon the cabinet members themselves without the necessity for special vertical chassis mountings.

A further object of the invention is the provision of a cabinet of this character employing the plenum method of ventilation in which air under pressure forces out heated air by displacement.

A further object of the invention is the provision of an electrical equipment cabinet of this type, including partitioning wall means, the cabinet and the wall means being formed of metallic material having electrical conductivity and magnetic permeability such as to provide a shielding action between adjacent compartments in the cabinet formed by the partitioning wall means.

Other and further objects of the invention will become apparent upon reading the following specification together with the accompanying drawing forming a part hereof.

Referring to the drawing.

Figure 1:
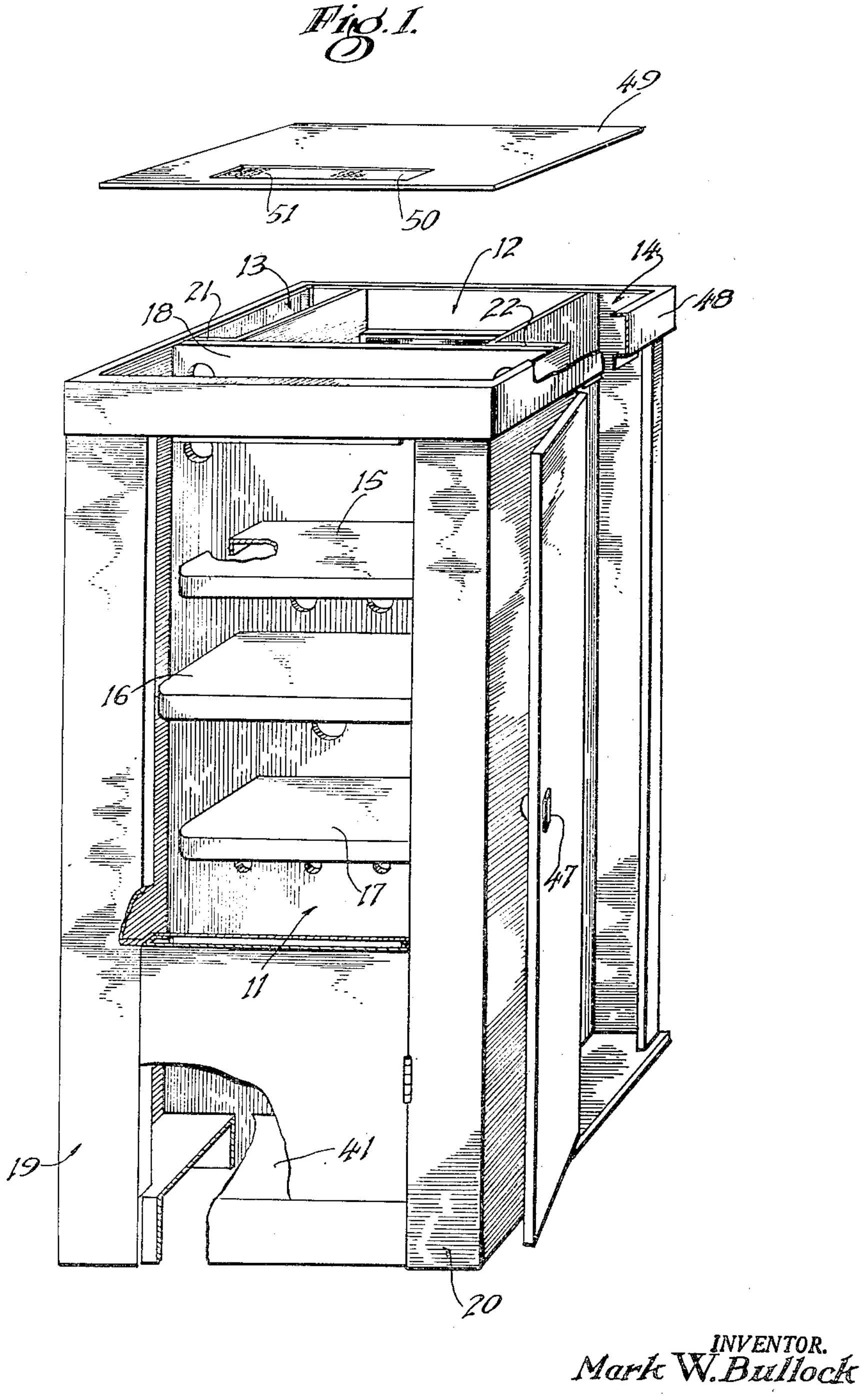
Figure 1 is a front perspective view of an embodiment of the invention, partly broken away, with the top cover shown raised above its normal position.
Figure 2:
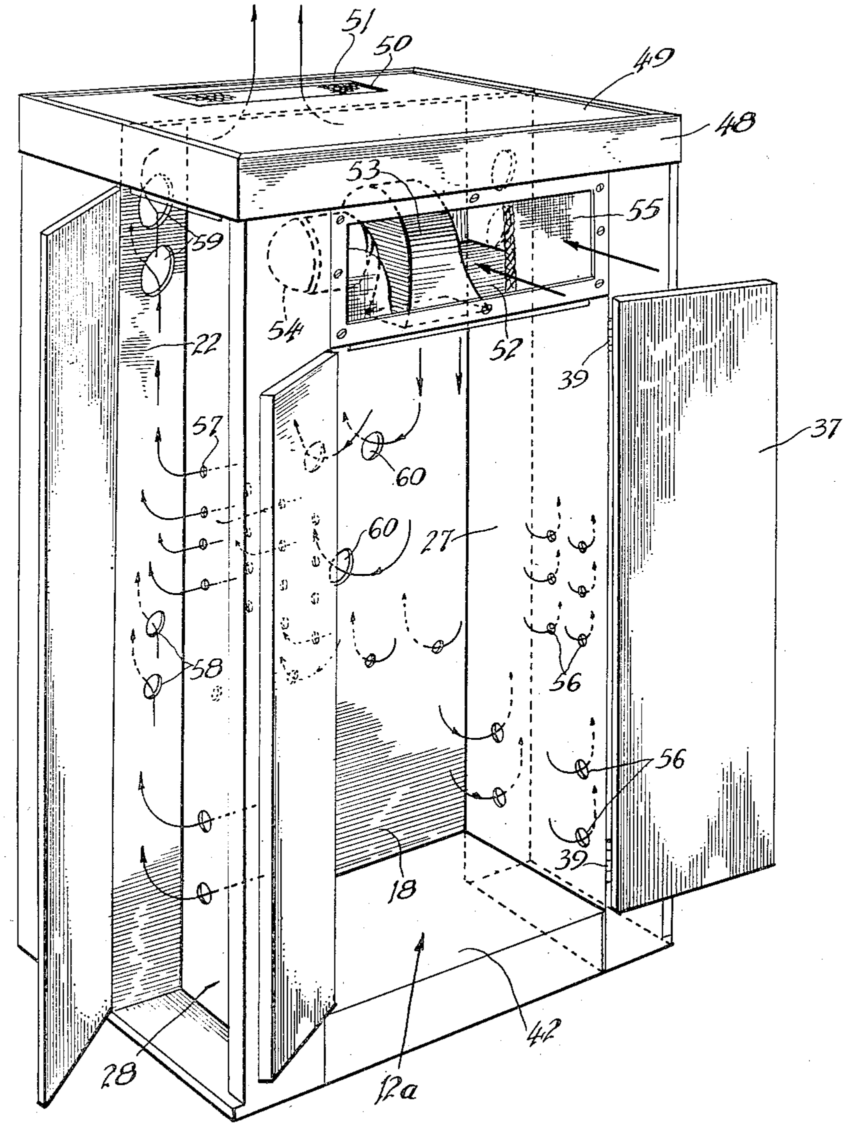
Figure 2 is a rear perspective view, partly broken away.

Referring to Figure 1, the embodiment of the invention there illustrated comprises a front compartment designated generally as 11, a rear compartment including a plenum chamber designated generally as 12, and two side compartments designated generally as 13 and 14.

Disposed in the front compartment 11, there are shown by way of illustration, three shelves 15, 16 and 17 which extend transversely in a horizontal direction across the compartment 11. The shelves 15, 16 and 17 are adapted for the mounting of equipment (not shown) such as transmitting tubes, rectifiers, or other heat generating apparatus. It should be noted that none of the shelves 15, 16 or 17 completely occupies the available horizontal area within the front compartment 11, so that the upward circulation of air is not obstructed.

The cabinet comprises a principal central vertical wall 18 which separates the front compartment 11 from the rear compartment 12. Two symmetrical side wall members 19 and 20 are secured to principal vertical wall 18 by welding, riveting, bolts or any other suitable and convenient fastening means.

The side wall members 19 and 20 are formed each with an offset jog portion 21 and 22 respectively, which jog portion is positioned directly against the principal vertical wall 18 at one of the lateral edge portions thereof.

Figures 3, 4, 5, 6, 7, 8:
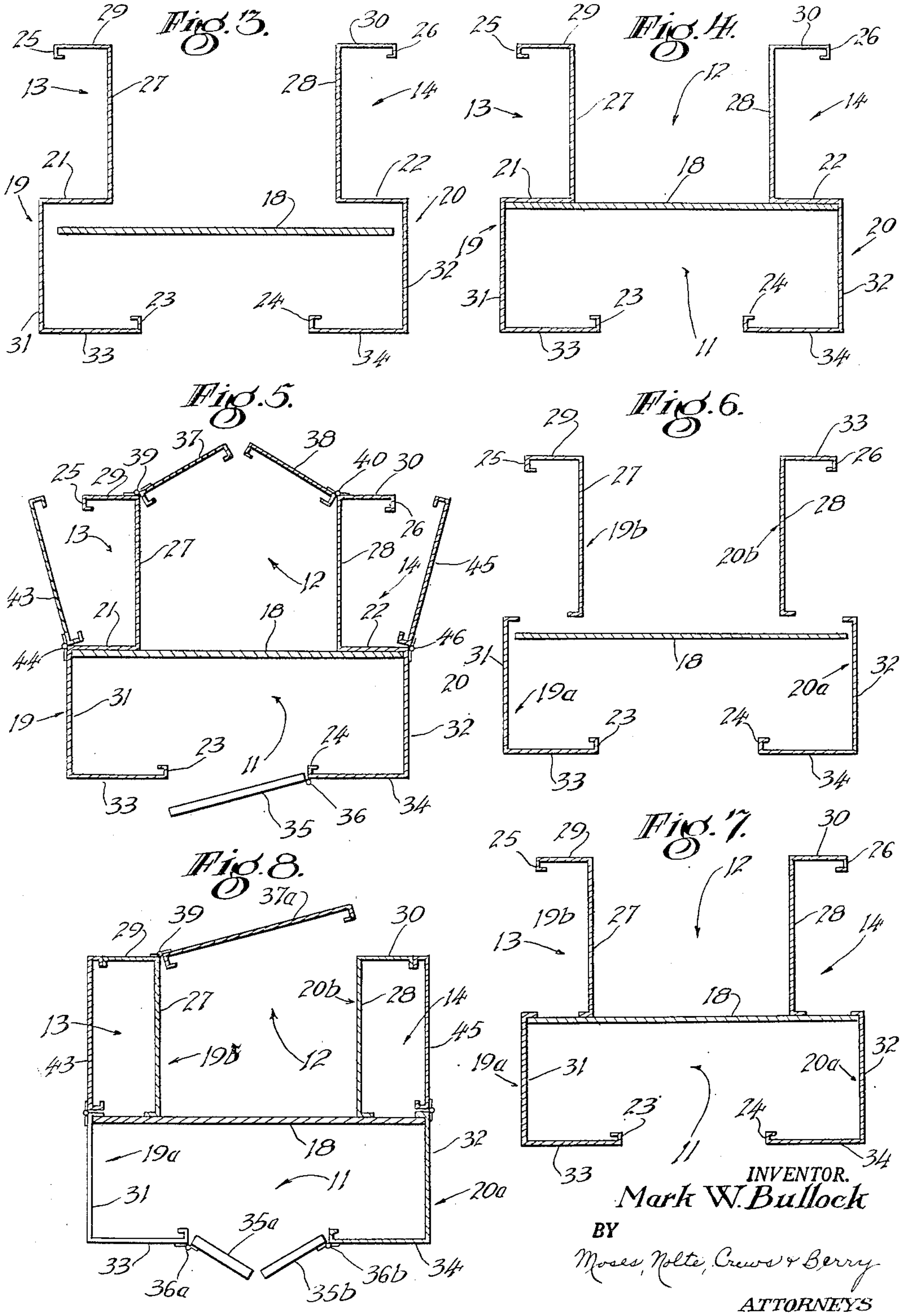
Figure 3 is a plan sectional view of a partially assembled equipment cabinet.
Figure 4 is a view similar to Figure 3, illustrating the equipment cabinet of Figure 3 in a more advanced condition of assembly.
Figure 5 is a view similar to Figures 3 and 4, showing the equipment cabinet in its completed condition of assembly.
Figures 6, 7 and 8 are similar to Figures 3, 4 and 5 respectively, illustrating a modified form of the invention.

In order to increase its rigidity and to finish its appearance, side wall member 19, at its front portion, is rectangularly bent back upon itself at 23 (Fig. 4). Side wall member 20 is similarly bent back upon itself at 24. Side wall members 19 and 20 are further provided with rectangularly bent back portions at the rear of the cabinet at 25 and 26 respectively.

The offset jogs 21 and 22 cause the rearwardly extending side wall portions 27 and 28 of side wall members 19 and 20 respectively, to be positioned inwardly from the lateral edges of principal vertical wall 18, and each of these side wall portions 27 and 28 forms a side of one of the side compartments 13 and 14 respectively.

Side wall member 27 extends laterally outwardly at 29 providing a rear wall for the side compartment 13. Side compartment 14 is similarly provided with a rear wall by the laterally outwardly extending portion 30 of side wall member 20.

The forwardly extending portion 31 of side wall member 19 forms a side wall for the front compartment 11. The other side wall of front compartment 11 is formed by the forwardly extending portion 32 of side wall member 20. Side wall member 19 extends laterally inwardly at the front of the cabinet, this laterally extending portion 33 forming a part of the front wall of front compartment 11. Another part of the front wall of front compartment 11 is formed by the laterally inwardly extending portion 34 of side wall member 20.

The front of the cabinet is closed by a front door 35 which is secured by hinges 36 to the laterally extending portion 34 of side wall member 20 at the rectangularly bent back portion 24. The door may be closed by any suitable lock or latch, the latch having been omitted for simplicity of illustration. If desired, the front door 35 may be provided with a glass panel in order to facilitate observation of the equipment in operation, and for the reading of meters in certain instances.

The rear compartment 12 is closed by a pair of doors 37 and 38. Door 37 is secured to side wall member 19 by hinges 39 which are positioned at the corner formed by rearwardly extending portion 27 and laterally extending portion 29 of side wall member 19. The other rear door 38 is mounted on hinges 40 positioned at the corner formed by the rearwardly extending portion 28 and laterally extending portion 30 of side wall member 20. The rear doors 37 and 38 may be held closed by any desired form of lock or latch, such latch having been omitted from the drawing for simplicity of illustration.

The front compartment 11 is provided at its bottom with a base member 41 which forms a raised floor in this section of the cabinet. The rear compartment 12 is similarly provided with a base member 42.

The left side compartment 13 is provided with a door 43 which is secured by hinges 44 to left side wall member 19 at the corner formed by the offset jog 21 and the forwardly extending portion 31 of side wall member 19.

The right side compartment 14 is provided with a door 45 which is secured by hinges 46 to the right side wall member 20 at the corner formed by the offset jog 22 and the forwardly extending portion 32 of side wall member 20. The right compartment door is shown provided with a cabinet lock 47 (Fig. 1).

The top of the cabinet is provided with an ornamental trim 48 which extends around all four sides, being suitably secured thereto in any convenient known manner. The top of the cabinet is closed by a flat cover 49, which is shown raised in Figure 1. The cover 49 has a rectangular aperture or air exhaust opening 50 therein, the opening 50 being covered by suitable screening 51.

At the upper portion of rear compartment 12 and mounted on a full shelf 52 is a centrifugal blower 53 driven by an electric motor 54. The intake of the blower 53 in above shelf 52, and the shelf 52 has an aperture therein through which air under pressure is forced by the blower 53 into the space below the shelf 52, which space constitutes a pressurized plenum chamber 12*a*. The air is drawn into the space above shelf 52 through an air filter 55, of conventional construction, which serves to remove dust or other particles from the air entering the cabinet.

The rearwardly extending portion 27 of the left side wall member 19 has a plurality of holes 56 therein which communicate with the plenum chamber 12*a* below shelf 52 in rear compartment 12 and which allow air to flow therefrom into the left side compartment 13. These holes 56 are of such size and are so positioned that the air flow into the left side compartment is distributed to provide proper ventilation for the particular equipment which may be installed therein.

Similarly, the rearwardly extending portion 28 of the right side wall member 20 has a plurality of holes 57 therein which allow air to flow from the plenum chamber 12*a* into the right side compartment 14. These holes are also of such size and are so located as to distribute air in accordance with the heat dissipation and heat distribution of apparatus mounted within the compartment 14.

The offset jog portion 22 of side wall member 20 also has a plurality of holes 58 therein which holes also pass through principal vertical wall 18, and allow air to flow from the side compartment 14 into the front compartment 11 at the right side portion of front compartment 11, similar holes being provided at the left side of the front compartment 11, if desired. Heated air leaves the side compartments by holes 59 located near the top of each compartment, passing through these holes and the upper portion of front compartment 11 and thence out of the cabinet through the air exhaust opening 50 and screen 51 in top cover 49.

Air is admitted from the plenum chamber 12*a* into the central portion of front compartment 11 through a plurality of holes 60 in principal vertical wall 18, the arrangement of these holes being such as to provide proper air circulation around the equipment installed on the shelves 15, 16 and 17 and in other portions of the front compartment 11. Air leaves front compartment 11 through the air exhaust opening 50 and screen 51 in top cover 49.

Figures 6, 7 and 8 show a modified form of construction of the cabinet. Instead of being of unitary construction, the two side wall members 19 and 20 are each made up of two parts. The two front parts 19*a* and 20*a* are secured to principal vertical wall 18 and the two rear parts 19*b* and 20*b* respectively are also separately secured to the principal vertical wall 18, thereby eliminating the offset jog portions 21 and 22.

As shown in Figure 8, the rear doors 37 and 38 have been replaced by a single rear door 37*a* and the front door 35 has been replaced by a pair of front doors 35*a* and 35*b* with appropriate hinges 36*a* and 36*b*. The construction of the modified form of cabinet shown in Figures 6 to 8 is otherwise the same as that described above for Figures 1 to 5.

From the foregoing description, it will be seen that the equipment cabinet of the present invention avoids the necessity for any angle iron or similar framework to support the sides of the cabinet or the electrical or other heat dissipating apparatus mounted therein.

The ventilating system permits the air to be circulated in a distribution pattern best suited to the needs of the particular heat dissipating apparatus installed in each of the compartments of the cabinet.

The vertical walls permit equipment to be vertically mounted without the need for any special vertical chassis. These walls and the outer walls of the cabinet are preferably formed of suitable metallic material having appropriate electrical conductivity and magnetic permeability such that, by dividing the cabinet into separate compartments, there is provided electromagnetic and electrostatic shielding between adjacent compartments, thereby permitting the equipment to be so disposed in different compartments that, in many instances, the necessity for separate shielding will be eliminated where such shielding would otherwise be required.

I have shown what I believe to be the best embodiments of my invention. I do not wish, however, to be confined to the embodiments shown, but what I desire to cover by Letters Patent is set forth in the appended claim.

I claim:

A cabinet adapted for the enclosure of a plurality of items of heat dissipating electrical apparatus requiring electrostatic and electromagnetic shielding from each other, said cabinet being constructed of sheet metal and having air intake and air exhaust openings therein, said cabinet having a body composed essentially of top and bottom horizontal members and three one-piece vertical members all extending substantially the full height of the cabinet, the vertical members consisting of a vertical transverse partition member and two vertical angle members, said vertical angle members comprising front, intermediate and rear horizontally spaced parallel walls, said front parallel wall and intermediate parallel wall being joined together at their outer edges by a first lateral wall and the intermediate parallel wall and rear parallel wall being joined together at their inner edges by a second lateral parallel wall, said vertical transverse partition being secured to each of said angle members at their intermediate parallel walls, thereby forming a main front compartment that extends the full width of the cabinet, two rear corner compartments, and an intermediate rear compartment, and hinged access doors for each of the compartments, the vertical members being bent along their vertically extending free edges to provide supporting means to lend rigidity to said cabinet, and said main compartment being provided with vertically spaced shelve members which occupy a substantial portion of the cross sectional area of said main cabinet, whereby heat dissipating apparatus may be arranged vertically upon the cabinet members without the necessity for special vertical chassis mountings, said vertical, horizontal and shelve members having electrical conductivity and magnetic permeability to provide shielding action, and said vertical members being apertured to permit flow of air from one of said compartments which constitutes a plenum compartment into each of the other compartments, all of the latter compartments being in communication with the exhaust opening.

References Cited in the file of this patent

UNITED STATES PATENTS

| | | |
|---|---|---|
| 1,464,932 | Hand | Aug. 14, 1923 |
| 1,578,276 | Foose | Mar. 30, 1926 |
| 2,022,644 | Ashcraft | Dec. 3, 1935 |
| 2,185,562 | Nielson | Jan. 2, 1940 |
| 2,191,637 | Wier | Feb. 27, 1940 |
| 2,394,060 | Holmes | Feb. 5, 1946 |
| 2,590,522 | Dyer et al. | Mar. 25, 1952 |
| 2,641,636 | Born et al. | June 9, 1953 |
| 2,645,743 | De Smidt | July 14, 1953 |